Patented July 15, 1924.

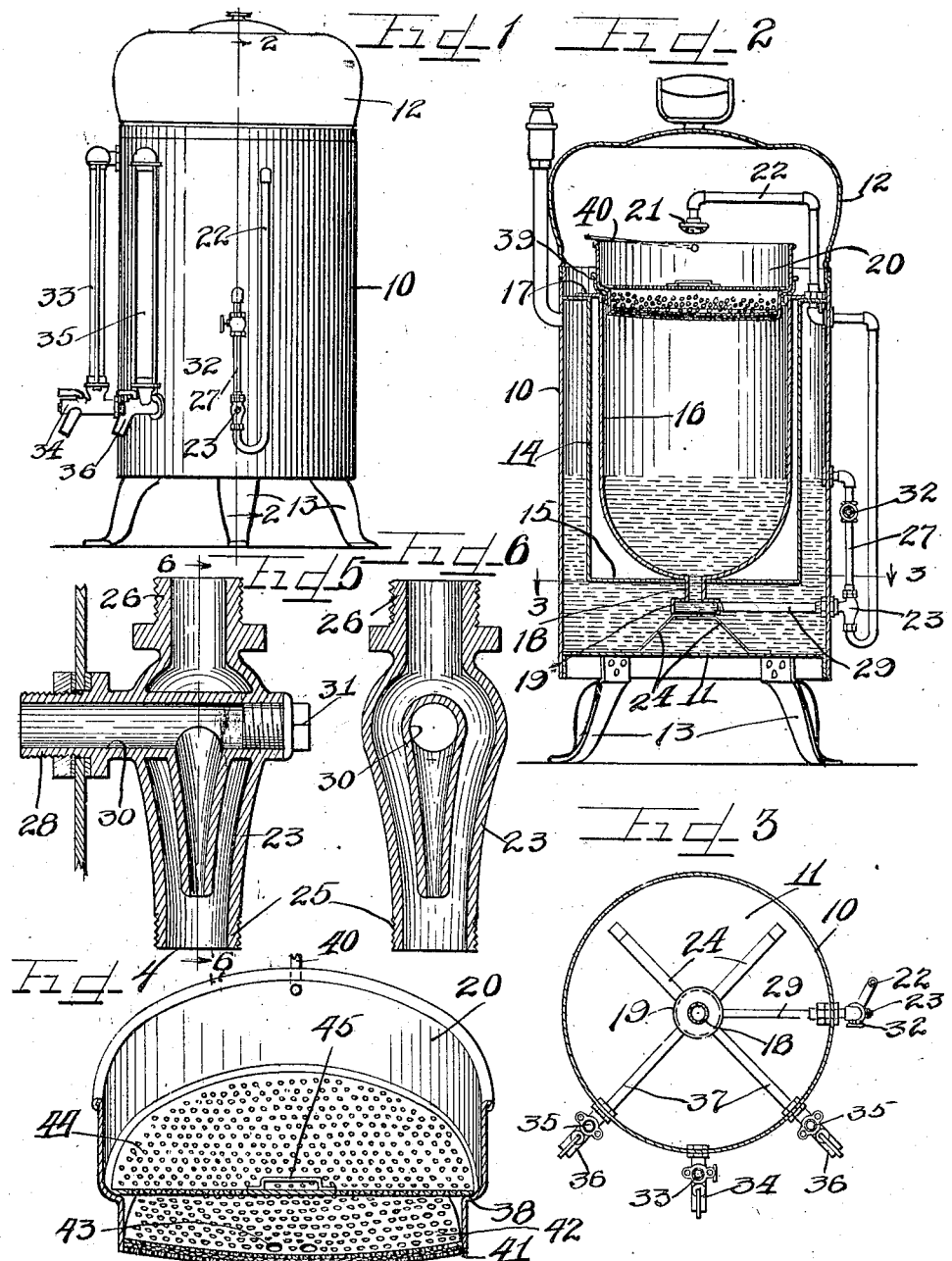
July 15, 1924.
N. J. ERZIG
COFFEE URN
Filed Aug. 8, 1923
1,501,165

1,501,165

UNITED STATES PATENT OFFICE.

NICHOLAS J. ERZIG, OF CHICAGO, ILLINOIS.

COFFEE URN.

Application filed August 8, 1923. Serial No. 656,350.

*To all whom it may concern:*

Be it known that I, NICHOLAS J. ERZIG, a citizen of the United States, and a resident of the city of Chicago, in the county of Cook and State of Illinois, have invented certain new and useful Improvements in a Coffee Urn; and I do hereby declare that the following is a full, clear, and exact description of the same, reference being had to the accompanying drawings and to the numerals of reference marked thereon, which form a part of this specification.

This invention relates to coffee urns such as are used in lunch counters and restaurants generally.

Heretofore, difficulty has been experienced in handling the spent coffee grounds and keeping the latter from spilling into the urn when the muslin or other thin fabric containing them is removed.

Further, in urns of this character it has been customary to steep the coffee instead of carrying out the desired extraction by a continuous percolation method.

One of the objects of the present invention is to provide a coffee urn in which the coffee extract is continuously circulated and percolated through the coffee grounds.

Another object of the invention is to provide an improved form of permeable retainer for coffee grounds.

It is also an object of the invention to provide an improved form of urn which, when heated, first delivers a charge of boiling hot water onto the coffee retainer and then causes such charge of water to be continuously circulated and percolated through the coffee grounds.

Other and further important objects of the invention will be apparent from the disclosures in the accompanying drawings and in the following specification.

The invention (in a preferred form) is illustrated in the drawings and hereinafter more fully described.

On the drawings:—

Figure 1 is a side elevation of an urn constructed in accordance with the present invention.

Figure 2 is a section on the line 2—2 of Figure 1.

Figure 3 is a section on the line 3—3 of Figure 2.

Figure 4 is a sectional view of the coffee ground retainer or basket.

Figure 5 is a vertical section through the injector which circulates the coffee extract.

Figure 6 is a section on the line 6—6 of Figure 5.

As shown on the drawings:

The urn comprises an outer shell 10 having a flanged bottom 11 and a removable cover 12. Suitable legs 13 are attached to the lower edge of the shell 10 and the flange of the bottom 11.

Within the shell 10 and spaced therefrom is another shell 14 flanged at its upper end to produce fluid tight contact with the shell 10. The shell 14 is provided with a bottom 15 integral therewith. The space between the shells 10 and 14 forms the boiler of the urn.

Inside the shell 14 is a container 16 provided with a flange 17 which rests upon the flanged portion of the shell 16. The bottom of this container is rounded and terminates in a short pipe leading to a liquid distributing chamber 19. Legs or stays 24 secured to the chamber 19 serve to hold the parts in rigid relation. It will be seen that there is an air space between the shell 14 and its bottom 15 and the container 16 so that when heat is applied to the boiler there will be little heat transferred through the walls of the boiler to the container.

Removably resting upon the container 16 is the coffee ground retainer or basket 20. Above the basket 20 is a nozzle 21 adapted to spray water over the contents of the basket. This nozzle is supported by a pipe 22 connected at its lower end to an injector 23.

The construction of this injector is shown more particularly in Figures 5 and 6, from which it will be seen that it comprises a nipple 25 for connection with the delivery pipe 22, a nipple 26 for connection to a pipe 27 leading to the boiler and a nipple 28 for connection to a pipe 29 leading to the distributing chamber 19.

The passage 30 in the nipple 28 is extended entirely through the injector and its outer end is normally closed by a screw plug 31 so that by removal of the latter the passage 30 and the pipe 29 may be readily cleaned.

The pipe 27 leading to the boiler enters the latter at a point about half-way between its top and bottom so that starting with the boiler nearly full of water the first effect of the generation of steam in the boiler is to cause the water in the boiler to be expelled by pipe 27 until the water level falls below the open end of the latter.

By keeping the valve 32 in the pipe 27 closed until some pressure has been created in the boiler, the water is driven out of the latter with sufficient force to carry it through the injector 23 up pipe 22 and out through the spray nozzle 21. If the pressure is not sufficient to accomplish this, part or all of the water may flow into the container 16 through injector 23, passage 30, pipe 29, distributing chamber 19 and pipe 18.

When the water level in the boiler drops below the end of the pipe 27, steam passes out and flowing at high velocity through the injector draws coffee liquid from the container 16 and forces it upwardly through the pipe 22. In this manner, after the initial charge of water has been introduced into the container, it is circulated round and round through the basket 20 containing the ground coffee.

A water gauge 33 provided with a draw-off cock 34 is provided for indicating the level of the water in the boiler. Similar gauges 35 and draw-off cocks 36 are provided for showing the height of the liquid in the container 16. In the latter case, the lower ends of the gauges and the cocks 36 are connected to the distributing chamber 19 by pipes 37.

The construction of the coffee grounds container or basket 20 is shown more particularly in Figure 4. The basket is formed with a shoulder 38 adapted to rest upon a ring 39 which in turn fits into and is supported by the container 16. A bail 40 allows the basket to be lifted and removed when desired.

The bottom of the basket is perforated and upon this perforated portion is laid a circular piece of cloth 41 which is held in place by a perforated plate 42 superimposed thereon. A pair of large apertures 43 are formed in the plate 42 to act as finger-holds to aid in lifting the plate when it is desired to change or clean the cloth 41.

After the ground coffee has been placed upon the perforated plate 42, another perforated plate 44 is inserted in the basket. The edges of this plate are supported by the shoulder 38 of the basket. A handle 45 allows of its ready insertion in and removal from the basket.

The apertures in the plate 44 are made conical with their larger ends at the bottom so that water flowing therethrough is spread out laterally so that it is sprayed over the entire mass of ground coffee in the basket.

I am aware that many changes may be may be made, and numerous details of construction may be varied through a wide range without departing from the principles of this invention, and I therefore do not purpose limiting the patent granted hereon, otherwise than necessitated by the prior art.

I claim as my invention:

1. A coffee percolating urn including a boiler, a coffee extract container, a permeable retainer for coffee grounds, a connection from said boiler to said container, said connection being adapted to supply first hot water and then steam, and means for causing the steam to circulate continuously the coffee extract through said permeable retainer.

2. A coffee percolating urn including a boiler, a coffee extract container, a permeable retainer for coffee grounds, a spray nozzle, a pipe leading thereto, an injector connected to said pipe, a suction connection from the injector to the lower part of said container, and a pressure connection from the injector to the boiler at a point intermediate the top and bottom thereof.

3. A coffee percolating urn including a boiler, a coffee extract container within said boiler, a permeable retainer for coffee grounds removably supported by said container, a connection from said boiler to said container, said connection being adapted to supply first hot water and then steam, and means for causing the steam to circulate the coffee extract through said permeable retainer.

4. A coffee percolating urn including a boiler, a coffee extract container within said boiler, a permeable retainer for coffee grounds removably seated thereon, a single spray nozzle above said retainer, a pipe leading thereto, an injector connected to said pipe, a suction connection from the injector to the lower part of said container, and a pressure connection from the injector to the boiler at a point intermediate the top and bottom thereof for the purpose specified, said pipe being arranged sufficiently high above the tops of the boiler, container and retainer to allow ready removal of the latter without disturbing said pipe and nozzle.

In testimony whereof I have hereunto subscribed my name in the presence of two subscribing witnesses.

NICHOLAS J. ERZIG.

Witnesses:
 CARLTON HILL,
 OSCAR HARTMANN.